(12) United States Patent
Davis et al.

(10) Patent No.: US 8,321,484 B2
(45) Date of Patent: Nov. 27, 2012

(54) MINIMIZING BANDWIDTH IN FILE PATH-CENTRIC PROTOCOL MESSAGE

(75) Inventors: Tristan A. Davis, Redmond, WA (US); Andrew Kenneth Bishop, Bothell, WA (US); Clifford Jeffrey Cruzan, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 12/713,816

(22) Filed: Feb. 26, 2010

(65) Prior Publication Data

US 2011/0213815 A1 Sep. 1, 2011

(51) Int. Cl.
*G06F 17/00* (2006.01)
*G06F 17/30* (2006.01)

(52) U.S. Cl. .................. 707/827; 707/999.101
(58) Field of Classification Search .............. 707/827, 707/803, 999.101, 999.203; 709/217–219, 709/223–226; 370/230
See application file for complete search history.

(56) References Cited

U.S. PATENT DOCUMENTS

| | | | | |
|---|---|---|---|---|
| 6,765,868 | B1 | 7/2004 | Dunn et al. | 370/230 |
| 6,973,504 | B2 | 12/2005 | Nomura | 709/235 |
| 7,165,095 | B2 * | 1/2007 | Sim | 709/217 |
| 7,555,531 | B2 | 6/2009 | Teodosiu et al. | 709/217 |
| 7,821,948 | B2 * | 10/2010 | Gunther et al. | 370/241.1 |
| 2001/0047393 | A1 | 11/2001 | Arner et al. | 709/216 |
| 2005/0273514 | A1 | 12/2005 | Milkey et al. | 709/232 |

OTHER PUBLICATIONS

Ranganathan, et al.; "*Design and Evaluation of Dynamic Replication Strategies for a High-Performance Data Grid*"; Dept. of Computer Science, The University of Chicago; Sep. 2001; 4 pgs.
Kulkarni, et al.; "*Redundancy Elimination Within Large Collections of Files*"; Proceedings of the 2004 USENIX Annual Technical Conference, Boston, MA; Jun. 2004; 14 pgs.
Bennett, B.; "*Information Dissemination Management/Advanced Intelligent Network Services for Department of Defense*"; Developed for MILCON 99, Defense Information System Agency, Information Transport Engineering Office, Information Dissemination Management/Intelligent Network Division (JEEA); Oct. 1996; 7 pgs.
Inovis, Inc.; "*Managed File Transfer: The Need for a Strategic Approach*" White Paper; Inovis, Inc.; 2007; 11 pgs.
Teodosiu, et al.; "*Optimizing File Replication over Limited-Bandwidth Networks using Remote Differential Compression*"; Microsoft Corporation; Nov. 2006; 16 pgs.

* cited by examiner

*Primary Examiner* — Marc Filipczyk
(74) *Attorney, Agent, or Firm* — Merchant & Gould P.C.

(57) ABSTRACT

Instead of sending each item separately to a service for processing, items are communicated to the service as one or more groups. Common portions of a file path for files within the group are transmitted once to the service. For example, a root portion of the file paths for the files within the group may be common to each of the files. The unique portions of the file path for each file are transmitted to the service without including the common portions. The size of the groups may be configured differently depending on needs of the specific instance of the protocol (i.e. smaller sized groups for more bandwidth-constrained situations). The size for the group may be determined in many different ways. For example, the size of the groups may be automatically determined based on a configuration and/or a user input.

20 Claims, 4 Drawing Sheets

MINIMIZING BANDWIDTH IN FILE PATH-CENTRIC PROTOCOL MESSAGE

BACKGROUND

When a service, such as a document conversion service, operates against large sets of files, a large number of file paths are communicated to the service for processing using a well-documented protocol. The transfer of this large amount of data can have an adverse impact on the performance of the service.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Instead of creating a message to send to a service that includes the full path for each file to be processed by the service, the common portions of the file paths for files being communicated to the service are transmitted once to the service. For example, a root portion of the file paths for the files being communicated to the service may be common to each of the files. The unique portions of the file path for each file are transmitted to the service without including the common portions that have already been determined. The overall set of files can then be broken down into groups which share these common portions. The size of the groups may be configured differently depending on needs of the specific instance of the protocol (i.e. smaller sized groups for more bandwidth-constrained situations). The size for the group may be determined in many different ways. For example, the size of the groups may be automatically determined based on a configuration and/or a user input.

DETAILED DESCRIPTION

Figure 1:
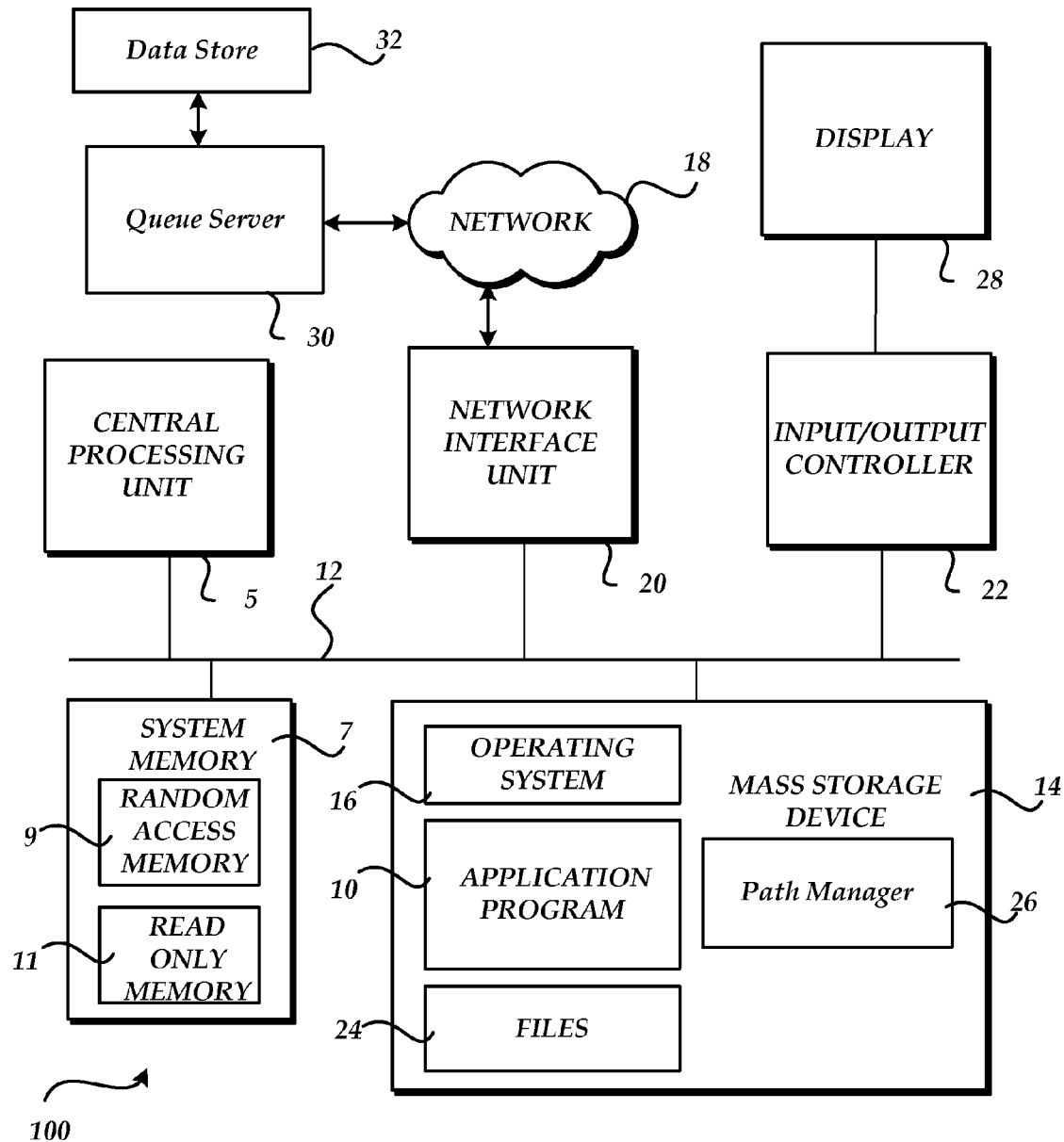
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. Computer 100 may be coupled to a queue server 30 that is coupled to a data store for storing items. According to one embodiment, data store 32 is configured to store a database. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer and/or a server computer, such as the WINDOWS 7® or WINDOWS SERVER® operating systems from MICROSOFT CORPORATION of Redmond, Wash. The mass storage device 14 and RAM 9 may also store one or more program modules. In particular, the mass storage device 14 and the RAM 9 may store an application program 10. The application program 10 is operative to interact with a service for processing files 24. For example, the service may be a file conversion service, a batch editing service, a photo editing service, and the like. Generally, the service operates on a large set of files that are each identified by a file path.

Although path manager 26 is shown separate from application program 10, it may be included within application program 10. As will be described in greater detail below, the path manager 26 is configured to determine the common portions of the file path from a set of files before transmitting a message to the service. Instead of creating a message to send to the service that includes the full path for each file to be processed, the common portions of the file path for the files is determined and the files are broken into one or more initial groups, based on the presence of a common portion of the file. The groups might be determined in many different ways. For example, they might be determined based on finding the smallest common path, based on the input list of files containing a hint as to the smallest common path, or the like. The common portions of the file path for the files are then communicated one time. The unique portions of the file path for each file are transmitted to the service without including the portion of the file paths that has been determined to be common to the files within the group. Once the initial groups have been determined, they may then broken down into more groups based on a size requirement for the groups. The size of the groups may be configured differently depending on needs of the specific instance of the protocol (i.e. smaller sized groups for more bandwidth-constrained situations). The size for the group may be determined in many different ways. For example, the size of the groups may be automatically determined based on a configuration and/or a user input.

Figure 2:
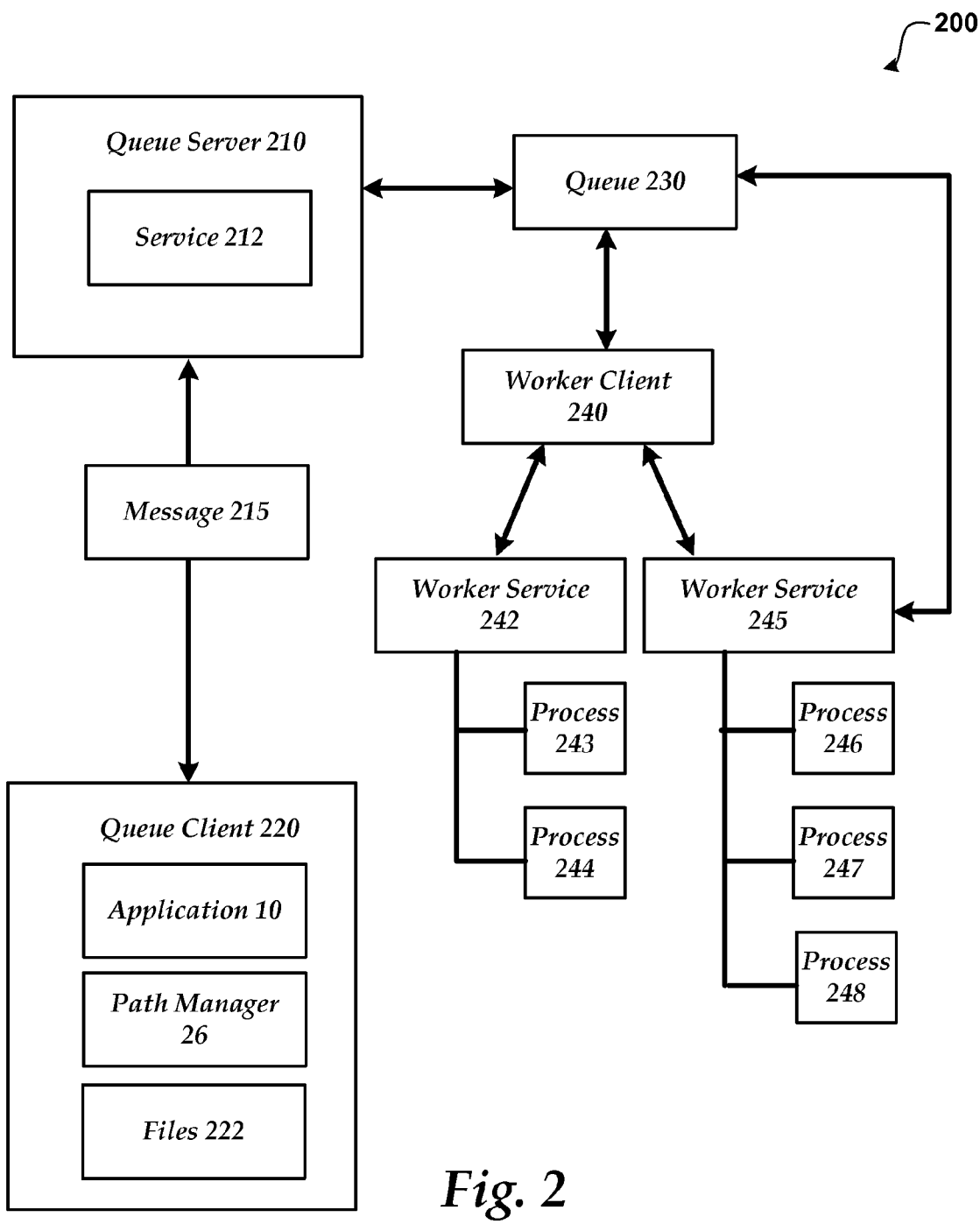
FIG. 2 shows a system for reducing a size of a file path-centric protocol message.

FIG. 2 shows a system for reducing a size of a file path-centric protocol message 200. As illustrated, system 200 includes queue server 210, queue client 220, queue 230, worker client 240, worker service 242, worker service 245 and processes 243, 244, 246, 247 and 248.

As briefly described above, the path manager 26 is directed at reducing the size of the file path-centric protocol message that is communicated over the protocol to service 212 on queue server 210. The service may be any type of service that operates on files, such as files 222. For example, the service may be a batch file processor, a conversion service, a formatting service, an archiving service, and the like. Generally, the service operates on a large set of files. Files 222 may be any number of files. For example, there could be 2, 100, 1000, 10,000, or even hundreds of thousands of files that are to be processed by service 212 on queue server 210. Service 212 places jobs and the files to process in queue 230. One or more worker clients, such as worker queue client 240, performs the processing on at least a portion of the files using one or more worker services (242, 243) that each utilize one or more processes (243, 244, 246, 247, 248).

According to one embodiment, the protocol which message 215 is transferred over is the Windows Communication Foundation (WCF) protocol. In order to reduce the size of the message(s) (215) that is communicated over the protocol, similar files (determined by user input or preprocessing) are communicated to queue server 210 as one or more groups. For example, if the action to be performed specifies that the files from a specific folder should be processed, queue client 220 determines that these files had, by virtue of being from the same folder, a substantially similar Uniform Resource Identifier (URI) and were therefore a good choice for a grouping. Queue client 220 and path manager 26 might also use other more sophisticated techniques to find other groupings. For example, different characteristics of the files can be determined and then split into groups based on the characteristics. The groups could also be set by an authorized user. The size of the final groups can also be manually configured and/or based on the needs of the specific instance of the protocol (i.e. smaller sizes for more bandwidth-constrained situations).

Path manager 26 splits files 222 into groups and transmits the common part of the file path for each of the files within the group once and then transmits the unique portions of the file path for each of the files within that group. For example, when the files are all stored within the same directory, the portion of the file path that is not unique may be only the name of the file. According to one embodiment, common extensions to files may also be determined to be common and only be sent one time. For example, the files 222 may all be .doc files in which case, .doc is common to all of the files. The splitting of the files into groups can be a simple operation that saves processing time and resources or can be a more complex operation that optimizes the groupings of the files.

In some examples, service 212 may be instructed to store the files in an output directory using a specific format. To further reduce the size of message 215, the output file format and/or output directory may be stored within message 215 a single time such that input and output files that differ only in extension are not transmitted multiple times.

This separation of the file path into common and unique components may also be persisted to a data store on the protocol server 210 side of the transaction, in order to reduce data storage costs and I/O, as the common component of the file paths is only stored/retrieved once. When service 212 processes the message, the common portions of the file path and other common items from the file names may be stored once within a data store such that the full path for each file is not recreated by service 212.

Once the determination is made as to how to group the files, common portions of the file paths are removed from each of the files within a group and stored once at the head or end of a group within the message. The following is one example of how to group messages with a common portion of the file path transmitted once.

```
<AddGroupRequest>
  <GroupId>1</GroupId>
  <InputRoot>http://sampleserver/Shared%20Documents/</InputRoot>
  <Items>
      <b:string>sample1.docx</b:string>
      <b:string>sample2.docx</b:string>
      ...
      Items until group is complete
      ...
  </Items>
  ...
  more data
  ...
</AddGroupRequest>
```

As discussed above, the file path-centric message may be reduced further in the case where the protocol is being used to transmit a list of input file paths and output file paths (i.e. if the operation to be performed is a bulk file conversion), by not transmitting the output file path if it differs from the input only by file extension. In the following example, the file extension is transmitted once, at the start of the message, and all subsequent file data is transmitted with an empty output file to signify that it differs from the input only in file extension:

```
<GroupId>1/GroupId>
<InputRoot>http://sampleserver/Shared%20Documents/</InputRoot>
<Items>
    <b:string>Fddddind%20Objects%20-%20a.docx.docx</b:string>
    <b:string>Find%20Objects%20-%20a.docx</b:string>
    <b:string>g.rtf</b:string>
    <b:string>a.doc</b:string>
    <b:string>a.docx</b:string>
    <b:string>a.rtf</b:string>
    <b:string>Newa.docx</b:string>
    <b:string>op/1/Simple__b.mht</b:string>
    <b:string>op/another/Simple__c.docm</b:string>
    <b:string>op/another/Simple__d.dotx</b:string>
    <b:string>op/Specification%20Title.docx</b:string>
    <b:string>opop/1/Simple__b.mht</b:string>
    <b:string>opop/another/Simple__c.docm</b:string>
    <b:string>opop/another/Simple__d.dotx</b:string>
    <b:string>opop/Specification%20Title.docx</b:string>
    <b:string>WORDD.DOT</b:string>
    <b:string>SSS%20Mobile%20Threat%20D.xml</b:string>
</Items>
<JobId>14533456988922280079</JobId>
<OutputRoot>http://sampleserver/output/</OutputRoot>
</AddGroupRequest>
```

According to one embodiment, an initial message is first sent by client 220 to server 210 that identifies the job settings. Following the first message, is one or more file-path centric messages that include the listing of the files to be processed. Finally, an end message is sent by client 220 to server 210 indicating that all of the files have been identified. The following is an example of an initial message, followed by the interim file path-centric messages, followed by the ending message.

Initial Message

```
<AddJobRequest
xmlns="http://.../addJob"
xmlns:b="http://.../conversionJobSettings"
xmlns:i="http://www.w3.org/2001/XMLSchema-instance">
<JobId>11181981853491788161</JobId>
<Name>Protocol example</Name>
<PartitionId i:nil="true" />
<Settings>
    <b:AddThumbnail>false</b:AddThumbnail>
    <b:CompatibilityMode>MaintainCurrentSetting</b:CompatibilityMode>
    <b:DoNotEmbedSystemFonts>tme</b:DoNotEmbedSystemFonts>
    <b:EmbedFonts>false</b:EmbedFonts>
    <b:FixedFormatSettings>
        <b:BalloonState>OnlyCommentsAndFormatting</b:BalloonState>
        <b:BitmapEmbeddedFonts>true</b:BitmapEmbeddedFonts>
        <b:Bookmarks>None</b:Bookmarks>
    <b:IncludeDocumentProperties>true</b:IncludeDocumentProperties>
    <b:IncludeDocumentStructure>true</b:IncludeDocumentStructure>
        <b:OutputQuality>Standard</b:OutputQuality>
        <b:UsePDFA>false</b:UsePDFA>
    </b:FixedFormatSettings>
    <b:MarkupView>Comments Ink Text Formatting</b:MarkupView>
    <b:OutputFormat>PDF</b:OutputFormat>
    <b:OutputSaveBehavior>AppendIfPossible</b:OutputSaveBehavior>
    <b:RevisionState>FinalShowingMarkup</b:RevisionState>
    <b:SubsetEmbeddedFonts>false</b:SubsetEmbeddedFonts>
    <b:UpdateFields>false</b:UpdateFields>
    ... other settings...
</Settings>
<UserToken i:nil="true" />
</AddJobRequest>
```

Interim Messages

```
<AddGroupRequest
xmlns="http://.../addGroup"
xmlns:b="http://... /Arrays"
xmlns:i="http://www.w3.org/2001/XMLSchema-instance">
<GroupId>1</GroupId>
<InputRoot>http://server/LoremIpsum/</InputRoot>
<Items>
    <b:string>Aenean%20nec.docx</b:string>
    <b:string>Fusce%20aliquet.docx</b:string>
    <b:string>Lorem%20ipsum.docx</b:string>
    <b:string>Nunc%20viverra.docx</b:string>
    <b:string>Pellentesque.docx</b:string>
</Items>
<JobId>11181981853491788161</JobId>
<OutputRoot>http://server/Archive/</OutputRoot>
</AddGroupRequest>
```

Final Message

```
<SubmitJobRequest
xmlns="http://.../submitJob">
<JobId>11181981853491788161</JobId>
</SubmitJobRequest>
```

Figure 3:
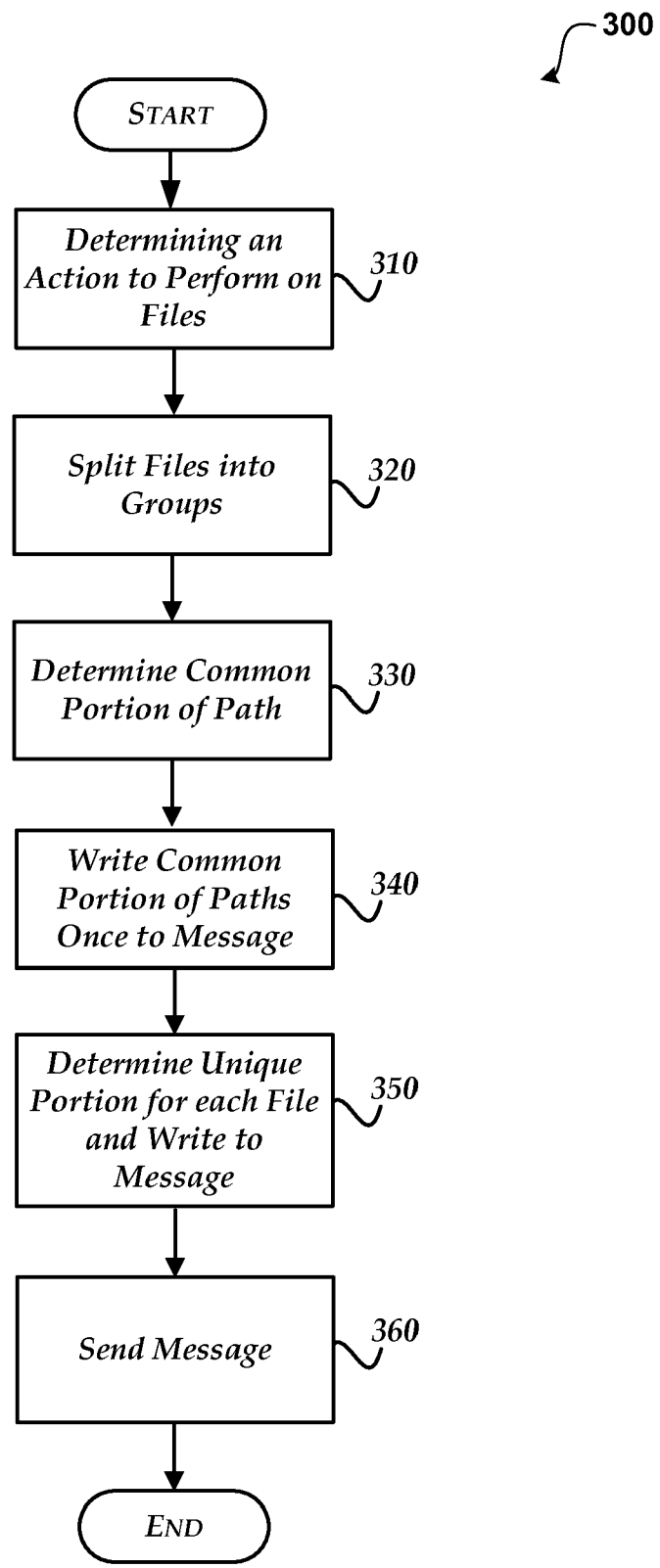
FIG. 3 illustrates a procedure for creating a file path-centric message.
Figure 4:
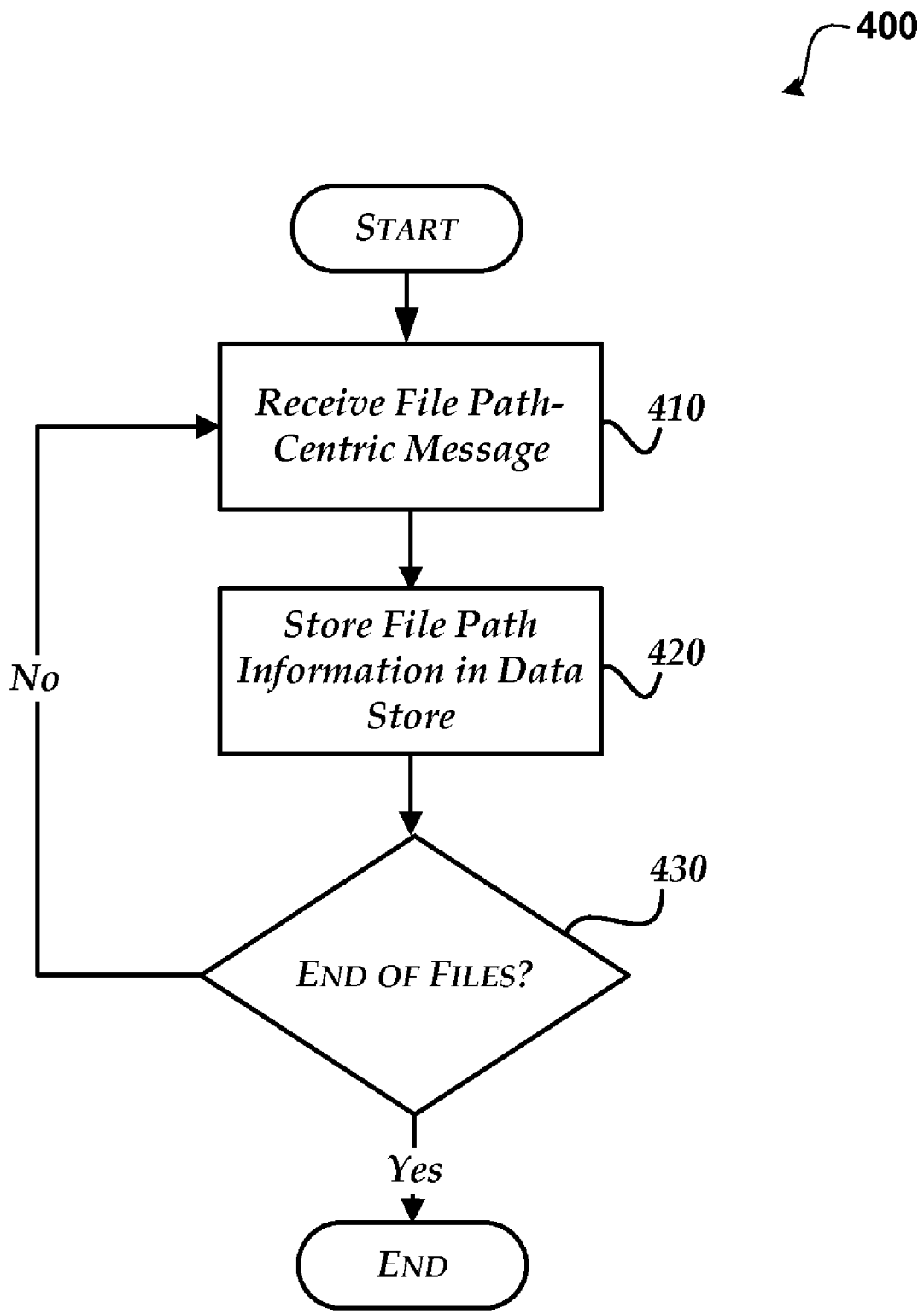
FIG. 4 illustrates a procedure for receiving file path-centric protocol messages at a server.

Referring now to FIGS. 3 and 4, an illustrative process for reducing a size of a file path-centric protocol message will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates a procedure for creating a file path-centric message.

After a start operation, the process flows to operation 310, where an action to perform on the files is determined. As discussed above, the action to be performed may be many different types of actions relating to file processing. For example, the action may be file conversion, batch editing, photo editing, archiving, and the like. Generally, a service performs the action and operates on a large set of files that are each identified by a file path.

Moving to operation 320, the files may be split into groups. The splitting of the files into groups may be performed at different times. For example, according to one embodiment, the files are split based on a maximum group size and another group is started once a number of the files have been stored in the message. In this way, the groups do not need to be predetermined. According to another embodiment, the files are preprocessed to determine the grouping of the files. Preprocessing the files may result in a more optimized grouping of the files. The grouping of the files may be determined automatically based on an action to be performed and/or manually configured by an authorized user. The groups may also be further subdivided. For example, initial groups may be created and then subdivided to meet a maximum group size requirement.

Flowing to operation 330, the common portion of the paths for the files is determined. The common portion determined may be one or more of the common portions of the path. For example, the common portions of the file path may include a common root of the path, a common middle portion of the path, a common document extension, and the like.

Transitioning to operation 340, the common portions for the file path are stored in the message for the group a single time. According to one embodiment, the message is structured as an XML message. The message may be structured in different ways. For example, the message may be a simple text listing or some other format.

Moving to operation 350, the unique portion of the file path for each of the files is determined. The unique portion is the portion of the file path that differs from the determined common portion(s). For example, when the files are all stored in a common directory and they are all of the same type, the unique portion may be only the name, or a portion of the name, of the file. The unique portion for each file is then stored within the message.

Flowing to operation 360, the message is sent to the service. According to one embodiment, when there are no more files to be transmitted, an ending message is sent to the service indicating that there are no other files to be transmitted.

The process then moves to an end operation and returns to processing other actions.

FIG. 4 illustrates a procedure for receiving file path-centric protocol messages at a server.

After a start operation, the process flows to operation 410, where a file path-centric message is received from the client. As discussed above, the file path-centric message includes identifying information to locate each of the files to be processed.

Moving to operation 420, the common portion of the paths that is included within the message is stored in a data store.

According to one embodiment, the common portion of the paths is stored a single time within the data store. In this way, the full path is not recreated and stored for each of the files. The file names may be stored in different ways. For example, the file names may be stored in a database, such as a SQL database, in a file, and the like.

Flowing to decision operation 430, a determination is made as to whether all of the file information has been received. According to one embodiment, all of the files have been received when an end message is received. According to another embodiment, all of the files have been received when a predetermined number of files have been received. When all of the files have not been received, the process returns to operation 410. When all of the file have been received, the process moves to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, performed by a computer having a processor and memory, for reducing data within a file path-centric protocol message, comprising:
generating a file path-centric protocol message regarding a group of files, wherein the group of files comprises at least a first file and a second file, wherein a first file path identifies a location of the first file and a second file path identifies a location of the second file;
determining a common portion between the first file path and the second file path, wherein the common portion is shared by the first file path and the second file path, and wherein the common portion is selected from one or more of the group of: a common root of the first file path and the second file path, a common middle portion of the first file path and the second file path, and a common document extension shared by the first file path and the second file path;
storing the common portion of the first file path and the second file path once within the file path-centric protocol message;
storing a first unique portion of the first file path within the file path-centric protocol message, wherein the first unique portion of the first file path is a different portion of the first file path from the common portion;
storing a second unique portion of the second file path within the file path-centric protocol message, wherein the second unique portion of the second file path is a different portion of the second file path from the common portion and the first unique portion; and
transmitting the file path-centric protocol message to a server.

2. The method of claim 1, further comprising determining a maximum size of the group of files.

3. The method of claim 2, further comprising creating an additional file path-centric protocol message when the maximum size of the group of files has been reached and all files in the group of files have not been transmitted to the server.

4. The method of claim 1, further comprising after the server receives the file path-centric protocol message, storing within a data store a single time the common portion of at least the first file path and the second file path.

5. The method of claim 2, wherein determining the maximum size of the group of files comprises determining a bandwidth restraint.

6. The method of claim 1, further comprising subdividing the group of files based on a bandwidth restraint.

7. The method of claim 1, wherein the common portion of the first file path and the second file path, the first unique portion of the first file path, and the second unique portion of the second file path are specified in Extensible Markup Language (XML) within the file path-centric protocol message.

8. The method of claim 1, further comprising sending an ending message indicating to the server that all files in the group of files have been transmitted.

9. A computer-readable storage medium having computer-executable instructions for reducing data within a file path-centric protocol message, the instructions comprising:
  on a client device, generating a file path-centric protocol message regarding a group of files on a server device, wherein the group of files comprises at least a first file and a second file, wherein a first file path identifies a location of the first file and a second file path identifies a location of the second file;
  determining a common portion between the first file path and the second file path, wherein the common portion is shared by the first file path and the second file path, and wherein the common portion is selected from one or more of the group of: a common root of the first file path and the second file path, a common middle portion of the first file path and the second file path, and a common document extension shared by the first file path and the second file path;
  storing the common portion of the first file path and the second file path once within the file path-centric protocol message;
  storing a first unique portion of the first file path within the file path-centric protocol message, wherein the first unique portion of the first file path is a different portion of the first file path from the common portion;
  storing a second unique portion of the second file path within the file path-centric protocol message, wherein the second unique portion of the second file path is a different portion of the second file path from the common portion and the first unique portion; and
  transmitting the file path-centric protocol message to the server.

10. The computer-readable storage medium of claim 9, further comprising determining a maximum size of the group of files.

11. The computer-readable storage medium of claim 10, further comprising creating an additional file path-centric protocol message when the maximum size of the group of files has been reached and all files in the group of files have not been transmitted to the server.

12. The computer-readable storage medium of claim 9, further comprising the server storing within a data store a single time the common portion of at least the first file path and the second file path for the group of files.

13. The computer-readable storage medium of claim 9, further comprising separating a plurality of files into one or more groups of files based on one or more actions to be performed on the plurality of files.

14. The computer-readable storage medium of claim 9, wherein the common portion of the first file path and the second file path, the first unique portion of the first file path, and the second unique portion of the second file path are specified in Extensible Markup Language (XML).

15. The computer-readable storage medium of claim 9, further comprising sending an ending message indicating to the server that all files in the group of files have been transmitted.

16. A system for reducing data within a file path-centric protocol message, comprising:
  a processor and a computer-readable storage medium;
  an operating environment stored on the computer-readable storage medium and executing on the processor;
  a network connection, and
  a path manager operating under the control of the operating environment and operative to perform actions, including:
    generating a file path-centric protocol message regarding a group of files on a server device, wherein the group of files comprises at least a first file and a second file, wherein a first file path identifies a location of the first file and a second file path identifies a location of the second file;
    determining a common portion between the first file path and the second file path, wherein the common portion is shared by the first file path and the second file path, and wherein the common portion is selected from one or more of the group of: a common root of the first file path and the second file path, a common middle portion of the first file path and the second file path, and a common document extension shared by the first file path and the second file path;
    storing the common portion of the first file path and the second file path once a within the file path-centric protocol message;
    storing a first unique portion of the first file path within the file path-centric protocol message, wherein the first unique portion of the first file path is a different portion of the first file path from the common portion;
    storing a second unique portion of the second file path within the file path-centric protocol message, wherein the second unique portion of the second file path is a different portion of the second file path from the common portion and the first unique portion; and
    transmitting the file path-centric protocol message to a server using the network connection.

17. The system of claim 16, further comprising the server storing within a data store a single time the common portion of at least the first file path and the second file path for the group of files.

18. The system of claim 16, further comprising separating a plurality of files into one or more groups of files based on one or more actions to be performed on the plurality of files.

19. The system of claim 16, wherein the common portion of the first file path and the second file path, the first unique portion of the first file path, and the second unique portion of the second file path are specified in Extensible Markup Language (XML).

20. The system of claim 16, further comprising sending an ending message indicating to the server that all files in the group of files have been transmitted.

* * * * *